June 29, 1965

H. L. ADAMS III 3,191,458

GEARLESS DIFFERENTIAL

Filed April 5, 1963

INVENTOR.
Herbert L. Adams, III
BY
E. W. Christen
ATTORNEY

大專利 Office 3,191,458
Patented June 29, 1965

3,191,458
GEARLESS DIFFERENTIAL
Herbert L. Adams III, Pontiac, Mich., assignor to General Motors Corporation, Detroit, Mich., a corporation of Delaware
Filed Apr. 5, 1963, Ser. No. 271,028
10 Claims. (Cl. 74—650)

This invention relates to a drive mechanism and more particularly to a mechanism for locking a drive member and a driven member together for drive in a given direction.

Some drive mechanisms in the prior art utilize a one-way sprag clutch for locking drive and driven members together. With such a clutch, drive is obtained in only one direction. A drive mechanism in the prior art which provides drive in two opposing directions uses a two-way sprag clutch with a plurality of sprags carried by the drive member with each sprag having a spring pressed wiping member in engagement with the driven member. With some of these prior art drive mechanisms, immediate jamming of the sprags between the drive and driven members occurs with motion of the drive member with respect to the driven member. Such jamming action may result in undue stresses being exerted on the members.

The mechanism of this invention comprises a two-way overrunning sprag clutch interposed between the members with a sprag carried by the drive member and pivotal with respect to the drive member from a clutch disengaged position to opposing clutch engaged positions. A stationary flexible sprag actuator protrudes in the path of the sprag and is located between the pivot point of the sprag and the driven member. Upon movement of the drive member in a given direction, the actuator is initially engaged by the sprag causing the sprag to pivot to a corresponding clutch engaged position where it jams between the members so as to lock the members together for drive in the given direction.

The two-way sprag clutch in the drive mechanism of this invention permits a drive member and a driven member to be locked together for drive in two opposing directions. The stationary flexible sprag actuator permits actuation of the sprags of the clutch to either of two opposed clutch engaged positions without the use of a spring pressed wiping member to lock the drive and driven members together and without immediate jamming.

The invention is particularly adapted for use as a positive drive differential mechanism wherein a pair of interacting overrunning clutches as described above are interposed between a pair of axles coaxially aligned with a ring gear carrier for selectively locking either or both of the axles with the carrier for drive in the same direction, corresponding with either forward or reverse rotation of the carrier. With such a mechanism in a motor vehicle, when one of the driving wheels is on an ice patch on a road surface, driving torque will be transmitted to the other driving wheel to enable the vehicle operator to negotiate the vehicle from the ice patch.

A more complete understanding of this invention may be had from the detailed description which follows taken with the accompanying drawings in which.

Figure 1:
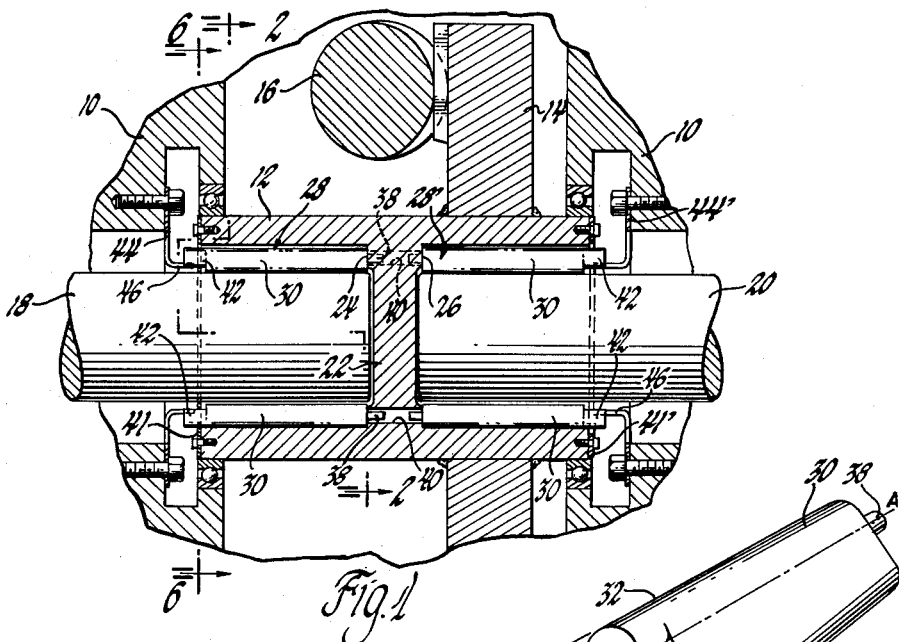
FIGURE 1 is a fragmenatry front elevational view partly in section illustrating the invention.

Referring now to the drawings and more particularly to FIGURE 1, there is shown a differential housing 10 containing a rotatable drive member taking the form of an annular ring gear carrier 12 having an annular ring gear 14 secured to the carrier in some suitable manner, as by welding, and meshing with a driving pinion 16. The carrier 12 coaxially surrounds a pair of driven members taking the form of cylindrical axles 18 and 20 axially separated by a sprag cage 22 defined by a central portion of the carrier 12. The cage 22 defines a pair of opposing annular flanges 24 and 26 coaxial with the carrier 12 and extending axially outward thereof and of sufficient inner diameter to respectively serve as radial thrust surfaces for axles 18 and 20. In addition, the remaining portion of the cage 22 radially inward of the flanges serves to resist thrust forces of axles 18 and 20 in a direction axially inward of the carrier 12.

Figure 2:
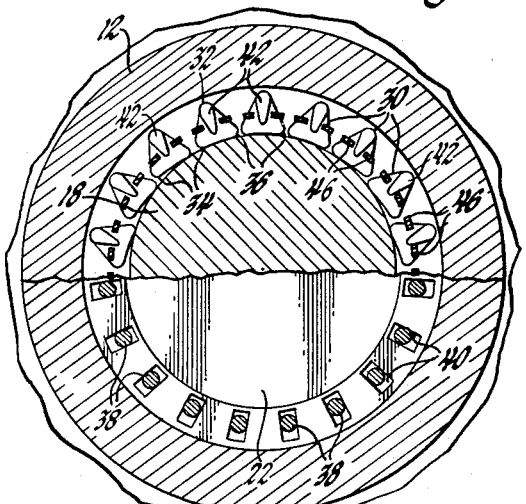
FIGURE 2 is an enlarged side elevational view partly in section and taken along line 2—2 in FIGURE 1.
Figure 4:
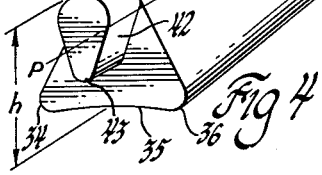
FIGURE 4 is a perspective view illustrating a sprag 30.
Figure 5:
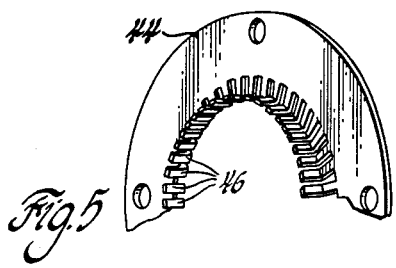
FIGURE 5 is a perspective view illustrating a sprag actuator ring 44.
Figure 6:
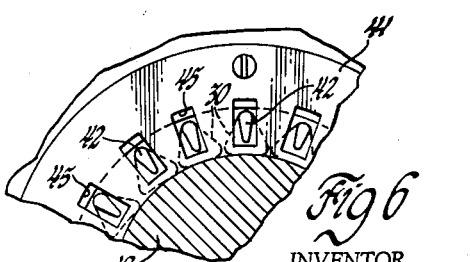
FIGURE 6 is an enlarged side elevational view partly in section and taken along line 6—6 in FIGURE 1.

In accordance with this invention, a positive drive mechanism is provided for selectively frictionally locking either or both of the axles 18 and 20 with the carrier 12 for drive in the same direction, corresponding with either forward or reverse rotation of the carrier. The mechanism takes the form of a pair of two-way interacting and overrunning clutches 28 and 28' respectively interposed between the carrier 12 and the axles 18 and 20. Each of the clutches 28 and 28' comprises a plurality of substantially identical sprags 30 arranged in annular array coaxial with the carrier 12, as shown in FIGURE 2. The cross-section of each sprag 30 is substantially an isosceles triangle, as shown in FIGURE 4, defined by three arcuate clutch or friction surfaces 32, 34, and 36, and having a surface 35 between surfaces 34 and 36 of concave curvature along the length of the sprag substantially corresponding with the curvature of axles 18 and 20. The size of each sprag 30 is such that the friction surfaces 34 and 36 are equally spaced from the friction surface 32 by a distance greater than that between either axle 18 or 20 and the carrier 12. Also, the height $h$ of each sprag 30 is less than the distance between either axle 18 or 20 and the carrier 12. Each sprag is carried by the carrier 12 and is pivotable in the carrier by means of a pivot post 38 defining a pivot axis PA and protruding from one end of the sprag in a direction axially inward of the carrier 12 and received by one of a plurality of rectangular recesses or slots 40 formed in the cage 22. The slots 40 extend through the cage 22 axially of the carrier 12 and are equally spaced in annular array coaxial with the carrier so as to mount an equal plurality of sprags on each side of the cage in similar annular array. The slots 40 are of sufficient size to permit limited movement of the pivot posts 38 radially of the carrier 12 so that frictional engagement may be obtained between the friction surface 32 of each sprag and the inner surface of the carrier.

Figure 3:
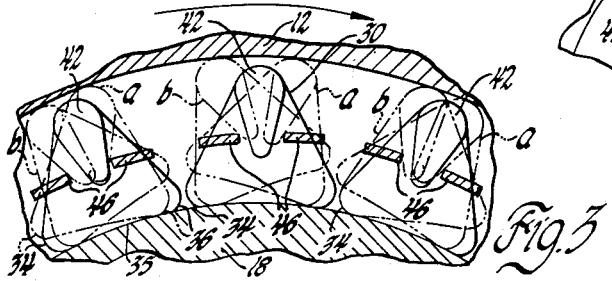
FIGURE 3 is an enlarged fragmentary view of FIGURE 2 illustrating the operation of the invention.

Each sprag 30 has a tapered sprag trip 42 protruding from one end in a direction axially outward of the carrier 12 and tapering inwardly from the friction surface 32 toward the concave surface 35 and symmetrical about a plane containing the pivot axis PA and a point midway between friction surfaces 34 and 36. In addition, each trip 42 terminates in a tapered end 43 located between the pivot axis PA and the surface 35. A pair of annular sprag trip cages 41 and 41' are suitably mounted on opposite ends of the carrier 12, as shown in FIGURE 1. Each of the cages 41 and 41' has a plurality of rectangular slots 45 formed therein equal in number to that of the slots 40 in the cage 22 and in axial alignment therewith with respect to the carrier 12. Each slot 45 is of sufficient size to receive a different one of the sprag trips 42 and permit limited movement of the trips radially of the carrier 12 so that frictional engagement may be obtained between the friction surface 32 of each sprag and the inner surface of the carrier. In addition, the size of each slot 45 permits sufficient pivotal movement of each trip 42 for each sprag 30 to pivot from a clutch disengaged position, as shown by the solid lines in FIGURE 3, to opposing forward and reverse clutch engaged positions, as shown by the respective dotted lines a and b in FIGURE 3.

The invention provides means for selectively pivoting the sprags 30 to the forward and reverse clutch engaged positions from the clutch disengaged position including a pair of spring steel trip actuator rings 44 and 44' suitably mounted opposite each other on the housing 10. Each ring includes a plurality of actuators 46 protruding therefrom in cantilever fashion and extending coaxially inward of the carrier 12 between the carrier and an associated axle. Whereas it is shown in FIGURE 2 that the number of actuators 46 of each ring are double that of the sprags in each clutch, it is apparent that an equal number could be used. Each actuator 46 is located in the rotational path of the trip 42 of each sprag 30 of an associated clutch, between the tapered end 45 and the pivot axis PA. The actuators 46 exhibit sufficient stiffness so that when the trips 42 bear against the actuators the sprags will pivot from the clutch disengaged position to a clutch engaged position. The actuators 46 also exhibit sufficient flexibility so that when the sprags are in a clutch engaged position and the carrier 12 rotates in a given direction, each actuator 46 will flex sufficiently radially inward of the carrier, when engaged by a trip 42, to be effectively out of the rotational path of the trips.

With the clutches 28 and 28' at rest and in the condition shown in FIGURE 2, gravitational forces will cause the sprags 30 in the upper portion to rest on the axle and the sprags in the lower or hidden portion to rest on the carrier 12. This is permitted by the slots 45 in the cages 41 and 41' and the slots 40 in the cage 22. During operation, upon clockwise rotation of the carrier 12, as indicated by the arrow in FIGURE 3, corresponding with forward vehicle movement, the trip 42 of each sprag 30 will initially bear against an adjacent trip actuator 46 in a manner to cause the sprags to pivot in a clockwise direction. Hence, it is seen that with sufficient clockwise rotation of the carrier 12 the friction surface 36 of each sprag in clutch 28 and the friction surface 34 of each sprag in clutch 28' will respectively be in frictional engagement with the axles 18 and 20. If the angular velocity of carrier 12 in the forward direction is greater than that of either axle 18 or 20, then due to the friction between the axles and the friction surface 36 of clutch 28 and friction surface 34 of clutch 28' a clockwise torque will be exerted on each sprag. This will cause the sprags 30 not in engagement with the carrier 12, i.e. the sprags in the upper portion in FIGURE 2, to move radially outward as permitted by the slots 40 and 45 in the cages 22 and 41, respectively. In this manner, the friction surface 32 of each sprag will frictionally engage the inner surface of the carrier 12 with a normal force in relation to the clockwise torque exerted on the sprag. The sprags 30 will then jam between the carrier 12 and the axles 18 and 20 to frictionally lock the axles with the carrier for positive drive in the clockwise direction. It is apparent that instead of a friction clutch as described above an effective lock between the axles 18 and 18' and the carrier 12 may be obtained if the surfaces of each sprag are serrated so as to lock with similar serrated surfaces on the carrier and the axles. After the axles are locked to the carrier, each actuator 46 will flex radially inward of the carrier, when engaged by a trip 42, so as to be effectively out of the rotational path of the trip to permit rotation of the sprags in the clockwise direction. Should one of the axles 18 or 20 speed up and reach an angular velocity in the clockwise direction exceeding that of the carrier 12, which occurs when a vehicle turns a corner, each sprag associated with such axle will be released from its jammed position so as to permit slippage or overrunning of the axle with respect to the carrier. The sprags will, of course, continue rotating with the carrier during such overrunning and will continue to engage the actuators 46 such that the sprags will be maintained in substantially their engaged position. In this manner, the actuators 46 prevent the sprags from pivoting in a counter-clockwise direction to their other extreme positions which, if permitted, would cause the axle of the overrunning wheel to lock with the carrier, preventing further overrunning and defeating the purpose of the drive mechanism. After the corner has been turned and upon return of the overrunning axle to an angular velocity less than that of the carrier 12, both axles will be locked with the carrier for drive in the clockwise direction. The overrunning action will occur simultaneously with both axles whenever the angular velocity of both exceeds that of the carrier. It is apparent that the clutch arrangement permits overrunning or positive drive in the manner as described above in the reverse as well as the forward direction of vehicle movement.

The drive mechanism of this invention is particularly useful for negotiating vehicles from troublesome ice patches on road surfaces. It is well known that with a conventional differential mechanism in a motor vehicle and when one of the driving wheels is located on an ice patch and the other is not, essentially all of the driving torque is transmitted to the driving wheel on the ice patch. That wheel will spin without appreciable traction with the road surface making it extremely difficult for the operator to negotiate the vehicle from the ice patch. However, if the vehicle has been equipped with the drive mechanism of this invention, both driving wheels will receive driving torque so as to more easily enable the operator to negotiate the vehicle from the ice patch. For example, assume a motor vehicle equipped with the drive mechanism of this invention is at rest with the motor off and with a driving wheel, not shown, connected with axle 18 located on an ice patch on a road surface and a driving wheel, not shown, connected with axle 18' in traction with the road surface. If the vehicle operator turns the motor on and with the transmission in gear for forward vehicle movement, the carrier 12 will move in a clockwise direction, as indicated by the arrow in FIGURE 3, and as described above the axles 18 and 18' will be locked to the carrier for drive in the clockwise direction. The driving wheel connected with axle 18 will spin with respect to the ice patch with little, if any, traction, depending on the angular velocity of axle 18 and the friction between the driving wheel connected with it and the ice patch on the road surface. However, the axle 18' is also locked to the carrier 12 for drive in the clockwise direction and if sufficient traction exists between the driving wheel connected with axle 18' and the road surface, the vehicle will exit from the ice patch.

Although the description of the invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:
1. A drive mechanism including a support, a drive member movable with respect to the support and supported thereby, a driven member, an overrunning clutch interposed between the members for locking the members together for drive in a given direction and comprising a sprag carried by the drive member and pivotal with respect thereto between a normally clutch disengaged position and a clutch engaged position, the sprag having opposing clutch surfaces spaced from each other by a distance greater than that between the drive and driven mem- bers and in engagement therewith when the sprag is in the clutch engaged position, and a flexible sprag actuator secured to the support and protruding into the path of movement of the sprag in the given direction and between the pivot point of the sprag and the driven member for causing the sprag to pivot to the clutch engaged position with movement of the drive member in the given direction and jam between the members to thereby lock the members together for drive in the given direction.

2. A drive mechanism including a support, a drive member movable with respect to the support and supported thereby, a driven member coaxially aligned with the drive member, a two way overrunning clutch interposed between the members for selectively locking the members together for drive in forward and reverse directions and comprising a sprag carried by the drive member and pivotal with respect thereto in opposing directions from a normally clutch disengaged position to opposing first and second clutch engaged positions, the sprag having a first clutch surface and second and third opposing clutch surfaces spaced from the first surface by a distance greater than the distance between the drive and driven members, the first surface being in engagement with the drive member when the sprag is in either clutch engaged position and the second and third clutch surfaces being respectively in engagement with the driven member when the sprag is in the first and second clutch engaged positions, and a resilient sprag actuator secured to the support and protruding into the rotational path of the sprag and between the pivot point of the sprag and the driven member for causing the sprag to pivot with movement of the drive member in a given direction from the clutch disengaged position to the corresponding clutch engaged position and jam between the members to lock the members together for drive in the given direction.

3. A positive drive mechanism as claimed in claim 2, wherein the clutch surfaces are friction surfaces.

4. A positive drive differential mechanism including a differential housing having a carrier rotatably mounted therein and receiving a pair of axles, a pair of overrunning and interacting clutches interposed between the axles and the carrier for selectively locking either or both of the axles with the carrier for drive in a given direction, each clutch including a sprag carried by the carrier and pivotal with respect thereto from a normally clutch disengaged position to a clutch engaged position, each sprag having opposing clutch surfaces spaced from each other by a distance greater than the distance between the carrier and the axle and in engagement therewith when the sprag is in the clutch engaged position, and a pair of flexible sprag actuators secured to the housing with each actuator protruding axially inward of the carrier from the housing, each actuator being located in the rotational path of a sprag of a clutch and between the pivot axis of the sprag and the axle for causing the sprag to pivot with rotation of the carrier in a given direction from the clutch disengaged position to the clutch engaged position and jam between the axle and the carrier to lock the axle and carrier together.

5. A positive drive differential mechanism including a differential housing having a carrier rotatably mounted therein and receiving a pair of axles, a pair of two way overrunning and interacting clutches interposed between the axles and the carrier for selectively locking either or both of the axles with the carrier for drive in the same direction, each clutch including a sprag carried by the carrier and pivotal with respect thereto in opposing directions from a normally clutch disengaged position to first and second opposing clutch engaged positions, each sprag having a first clutch surface and second and third opposing clutch surfaces spaced from the first surface by a distance greater than the distance between the carrier and the axle, the first clutch surface being in engagement with the carrier when the sprag is in either clutch engaged position and the second and third clutch surfaces being respectively in engagement with the axle when the sprag is in the first and second clutch engaged positions, and a pair of resilient sprag actuators secured to the housing with each actuator protruding axially inward of the carrier from the housing, each actuator being located in the rotational path of a sprag of a clutch and between the pivot axis of the sprag and the axle for causing the sprag to pivot with rotation of the carrier in a given direction from the clutch disengaged position to the corresponding clutch engaged position and jam between the axle and the carrier to lock the axle and carrier together.

6. A positive drive differential mechanism including a differential housing having a carrier rotatably mounted therein and receiving a pair of cylindrical axles, a pair of two way overrunning and interacting clutches interposed between the axles and the carrier for selectively frictionally locking either or both of the axles with the carrier for drive in the same direction, sprag cage means for each clutch and carried by the carrier for rotation therewith and having an annulus of equally spaced recesses therein, each clutch comprising a plurality of sprags each having a pivot post protruding therefrom and directed axially inward of the carrier and pivotally received by one of the recesses in the cage means for pivotal movement in opposing directions from a central normally clutch disengaged position to first and second opposing clutch engaged positions, each sprag having a first friction surface and second and third opposing friction surfaces spaced from the first surface by a distance greater than the distance between the carrier and the axle, the first friction surface being in engagement with the carrier when the sprag is in either clutch engaged position and the second and third friction surfaces being respectively in engagement with the axle when the sprag is in the first and second clutch engaged positions, each sprag having a trip protruding therefrom directed axially outward of the carrier including a portion located between the pivot axis of the sprag and the axle, and a pair of annuli of resilient sprag actuators with the actuators of each annulus protruding axially inward of the carrier from the support, each actautor being located in the rotational path of the trips protruding from the sprags of a clutch and between the pivot axes thereof and the axle for causing the sprags to pivot with rotation of the carrier in a given direction from the clutch disengaged position to the corresponding clutch engaged position and jam between the axle and the carrier to lock the axle and carrier together.

7. A positive drive differential mechanism as claimed in claim 6, wherein the sprag cage means comprises a central portion of the carrier with the recesses therein being slots extending through the central portion axially of the carrier, and wherein a pair of sprag trip cages are carried by the carrier at opposite ends of the carrier with each cage having a plurality of slots therein equal in number to and in alignment with the slots in the central portion and with each slot in each trip cage receiving a trip protruding from a sprag, and the sizes of the slots in the central portion and in the trip cages being such to permit pivotal movement of each sprag from the clutch disengaged position to either clutch engaged position and movement of each sprag radially of the carrier to the extent that frictional engagement may be obtained between the first friction surface of each sprag and the carrier.

8. A positive drive mechanism as claimed in claim 7, wherein the central portion defines opposing annular flanges extending outwardly of and coaxial with the carrier and located between each axle and the annulus of slots in the central portion with each flange and the remaining central portion radially inward of the flange respectively serving as radial and axial thrust surfaces for one of the axles.

9. A drive mechanism including a support, a drive member rotatably carried by the support, a driven member coaxial with the drive member and rotatable with respect thereto, a pair of opposed concentric radially inner and outer facing surfaces one on each of said drive and driven members, at least one sprag interposed between the surfaces and pivotally carried by the drive member for movement into and out of frictional engagement with the surfaces, and a resilient sprag actuator secured to the support and extending into the path of movement of the sprag to urge the sprag toward its engaged position, whereby the members are caused to be frictionally locked together for drive in a given direction while the driven member is enabled to overrun the drive member in said direction.

10. A drive mechanism including a support, a drive member rotatably carried by the support, a driven member coaxial with the drive member and rotatable with respect thereto, a pair of opposed concentric radially inner and outer facing surfaces one on each of said drive and driven members, at least one sprag interposed between the surfaces and pivotally carried by the drive member for movement from a central disengaged position to opposing first and second positions of frictional engagement with the surfaces, and a resilient sprag actuator secured to the support and extending into the path of movement of the sprag such that upon movement of the drive member in either direction, the sprag will be urged by the actuator toward one of the engaged positions, frictionally locking the members together for drive in the direction of movement of the drive member while permitting the driven member to overrun the drive member in said direction.

References Cited by the Examiner

UNITED STATES PATENTS

| 1,406,211 | 2/22 | Myers | 74—650 |
| 1,422,144 | 7/22 | Sowden | 74—650 |

FOREIGN PATENTS 839,049  12/38  France.

DAVID J. WILLIAMOWSKY, *Primary Examiner.*